(12) United States Patent
Sugiyama (10) Patent No.: US 9,152,274 B2
(45) Date of Patent: Oct. 6, 2015

(54) OPTICAL TOUCH PANEL APPARATUS FOR DETECTING A TOUCH ON A PERIPHERAL AREA

(71) Applicant: Koichi Sugiyama, Osaka (JP)

(72) Inventor: Koichi Sugiyama, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 170 days.

(21) Appl. No.: 13/658,462

(22) Filed: Oct. 23, 2012

(65) Prior Publication Data

US 2013/0100083 A1 Apr. 25, 2013

(30) Foreign Application Priority Data

Oct. 25, 2011 (JP) ................................. 2011-234254

(51) Int. Cl.
*G06F 3/042* (2006.01)

(52) U.S. Cl.
CPC ..................................... *G06F 3/0421* (2013.01)

(58) Field of Classification Search
CPC .................................................. G06F 3/0421
USPC ........................................................ 345/175
See application file for complete search history.

(56) References Cited

U.S. PATENT DOCUMENTS

| 2002/0033805 A1 | 3/2002 | Fujioka et al. |
| 2009/0174679 A1* | 7/2009 | Westerman .................... 345/173 |
| 2011/0260999 A1* | 10/2011 | Wang et al. .................... 345/173 |

FOREIGN PATENT DOCUMENTS

| JP | 4-323716 | 11/1992 |
| JP | 2002-091683 A | 3/2002 |

* cited by examiner

*Primary Examiner* — Long D Pham
(74) *Attorney, Agent, or Firm* — Birch, Stewart, Kolasch & Birch, LLP (57) ABSTRACT

An optical touch panel apparatus for detecting a position of a light blocking object on a flat panel 2 includes a plurality of light emitting elements and light receiving elements arranged along a side of the rectangular flat panel 2. The optical touch panel apparatus sets a peripheral area on the flat panel 2, and performs position detection in an area other than the peripheral area while not performing position detection within the peripheral area. The peripheral area is an area proximal to the light emitting elements or light receiving elements, in which resolution for position detection is deteriorated and unsatisfactory light blocking is likely to occur. By limiting the area for which position detection is performed to the area other than the peripheral area, deterioration in resolution for position detection and occurrence of unsatisfactory light blocking can be prevented, making it possible to stably perform position detection.

7 Claims, 10 Drawing Sheets

FIG. 10 ly performs position detection and to a recording medium.

OPTICAL TOUCH PANEL APPARATUS FOR DETECTING A TOUCH ON A PERIPHERAL AREA

CROSS-REFERENCE TO RELATED APPLICATIONS

This Nonprovisional application claims priority under 35 U.S.C. §119(a) on Patent Application No. 2011-234254 filed in Japan on Oct. 25, 2011, the entire contents of which are hereby incorporated by reference.

BACKGROUND

1. Technical Field

The present invention relates to an optical touch panel apparatus optically performing position detection and to a recording medium.

2. Description of Related Art

One of the conventionally-used touch panel apparatus is an optical touch panel apparatus. Japanese Patent Application Laid-Open No. 2002-91683 discloses an example of the optical touch panel apparatus. The optical touch panel apparatus includes a plurality of light emitting elements arranged in the x-axis direction and the y-axis direction along the side of a rectangular flat panel, and a plurality of light receiving elements at positions opposed to the light emitting elements along the side of the flat panel. The light emitted by a light emitting element moves along the surface of the flat panel and is received by a light receiving element. Accordingly, an optical path in which the light emitting element emits light and the light receiving element receives light is formed on the flat panel. When a user places a light blocking object such as a finger or a pen on the flat panel, a light receiving element which cannot receive light occurs due to the light blocking object blocking light. The optical touch panel apparatus identifies a position of a light receiving element which cannot receive light among the light receiving elements arranged in the x-axis direction and the y-axis direction, to detect a position of the light blocking object on the flat panel.

The light emitting elements and the light receiving elements in the optical touch panel apparatus are so arranged that each light emitting element is opposed to each light receiving element in one-to-one correspondence. As for the method of detecting a position of a light blocking object performed by the optical touch panel apparatus, there are a whole area scanning method scanning the entire flat panel and a specific area scanning method scanning while focusing around the light blocking object. In the whole area scanning method, the optical touch panel apparatus causes a plurality of light emitting elements, from one end to the other end, to sequentially emit light, and causes a plurality of light receiving elements, each of which is opposed to each of the light emitting elements in one-to-one correspondence, to receive the light. The light from one light emitting element is received by one light receiving element. Optical paths of the light received by a plurality of light receiving elements that are in one axial direction are in parallel with one another. The resolution for position detection is determined by a distance between adjacent light emitting elements.

In the specific area scanning method, the optical touch panel apparatus causes a plurality of light receiving elements to receive light from one light emitting element. The optical paths of light received by the plurality of light receiving elements are radial optical paths starting from one light emitting element. Due to increased density of the optical path used for position detection, the resolution for position detection is more enhanced in the specific area scanning method than the whole area scanning method. The optical touch panel apparatus first roughly detects the position of a light blocking object by the whole area scanning method to detect the light blocking object, and then scans an area around the light blocking object with the specific area scanning method, to detect the position of the light blocking object with high accuracy.

SUMARY OF THE INVENTION

The density of optical paths used for position detection in the specific area scanning method is substantially uniform at a portion near the central portion of the flat panel, while it becomes more and more biased toward an edge of the flat panel. For example, a portion close to an edge of the flat panel is in proximity to a light emitting element or a light receiving element. A large number of optical paths are concentrated at the front surface of a light emitting element or a light receiving element whereas few optical paths are present at a position distant from the front surface of a light emitting element or a light receiving element. This has caused such a problem that the resolution for position detection is deteriorated depending on a position, at a portion close to an edge of the flat panel.

Moreover, the conventional optical touch panel apparatus also had a problem of unsatisfactory light blocking. The conventional optical touch panel apparatus utilizes infrared light to perform position detection, and covers a light receiving element with a cover made by using a filter through which infrared light penetrates. The provision of the cover can eliminate the effect of outside light and prevent a foreign object such as dust from entering inside. Light may, however, reflect on the cover without transmitting therethrough depending on an incidence angle of light with respect to the cover. Here, unsatisfactory light blocking may occur in which the light reflected on the cover enters a receiving element which is not supposed be receiving light because the light is blocked by a light blocking object. If the unsatisfactory light blocking occurs, position detection will fail. It is, therefore, difficult to stably perform position detection with the conventional optical touch panel apparatus because of deterioration in the resolution for position detection in accordance with a position and occurrence of unsatisfactory light blocking.

The present invention has been devised in view of the above circumstances, and has an object to provide an optical touch panel apparatus and a recording medium that enable stable position detection by limiting an area for which position detection is performed.

An optical touch panel apparatus according to the present invention includes a flat panel and an optical path generation unit for generating a plurality of optical paths on the flat panel. The optical touch panel apparatus for detecting a position at which any one of the optical paths is blocked on the flat panel further includes a setting unit for setting a band-like peripheral area on the flat panel, and an area limitation unit for limiting an area for which detection of the position is to be performed among areas on the flat panel to an area excluding the peripheral area set by the setting unit.

The optical touch panel apparatus according to the present invention is characterized in that the flat panel is rectangular, that the optical path generation unit includes: a plurality of light emitting elements arranged along each of adjacent two sides of the flat panel; and a plurality of light receiving elements arranged along sides opposed to the two sides, respectively, and that the setting unit sets the peripheral area so as to include an area outside a line connecting light emitting elements arranged on both ends of one side of the two sides and a light receiving elements arranged on both ends of a side opposed to the above-described one side to be in parallel with each other, and outside a line connecting light emitting elements arranged on both ends of the other side of the two sides and light receiving elements arranged on both ends of a side opposed to the above-described other side to be in parallel with each other.

The optical touch panel apparatus according to the present invention is characterized in that the setting unit sets the peripheral area so as to include an area, among areas on the flat panel, in which a distance between optical paths generated by the optical path generation unit is equal to or more than a given distance.

The optical touch panel apparatus according to the present invention is characterized in that the setting unit sets the peripheral area so as to include an area, among areas on the flat panel, in which a distance between optical paths so generated by the optical path generation unit that light from one light emitting element is received by a plurality of light receiving elements is equal to or more than a given distance.

The optical touch panel apparatus according to the present invention is characterized by further including: a display unit for displaying an image on the flat panel used as a display surface; and a display control unit for causing the display unit to display an image including a specific partial image occupying the peripheral area in the flat panel.

An optical touch panel apparatus according to the present invention is characterized by including: an optical touch panel unit having a flat panel as well as a plurality of light emitting elements and a plurality of light receiving elements generating a plurality of optical paths on the flat panel; and a processing unit. The optical touch panel unit includes an input unit for inputting to the processing unit a result of light receiving at the plurality of light receiving elements in a case where any one of the light emitting elements emits light. The processing unit includes: a setting unit for setting a band-like peripheral area on the flat panel; a detection unit for detecting a position at which light to be received by any one of the light receiving element is blocked on the flat panel based on the result of light receiving input from the optical touch panel unit; and an invalidation unit for invalidating a detection result for the position if the position detected by the detection unit is included in the peripheral area.

A non-transitory recording medium according to the present invention, which is readable by a computer recording a computer program for causing a computer, to which a result of light receiving at a plurality of light receiving elements in a case where any of a plurality of light emitting elements emits light is input from an optical touch panel unit having a flat panel as well as the plurality of light emitting elements and light receiving elements generating a plurality of optical paths on the flat panel, to execute processing of detecting a position at which light to be received by any one of the light receiving elements is blocked on the flat panel, is characterized in that the computer program includes the steps of: causing the computer to set a band-like peripheral area on the flat panel; causing the computer to detect the position based on the result of light receiving input from the optical touch panel unit; and causing the computer to invalidate a detection result of the position if the position is included in the peripheral area.

According to an aspect of the present invention, the optical touch panel apparatus detecting a position where light is blocked at an optical path on a flat panel sets a peripheral area, and performs position detection in an area other than the peripheral area while not performing position detection within the peripheral area. No position detection is performed in the peripheral area, thereby preventing deterioration in resolution for position detection and occurrence of unsatisfactory light blocking.

According to another aspect of the present invention, the optical touch panel apparatus makes the peripheral area include an area outside a line connecting light emitting elements on both ends of a side of the rectangular flat panel and light receiving elements on both ends thereof among a plurality of light emitting elements and light receiving elements arranged along the side of the rectangular flat panel. The area where the resolution for position detection is most deteriorated is included in the peripheral area.

According to another aspect of the invention, in the optical touch panel apparatus, the peripheral area includes an area where the distance between optical paths generated on the flat panel becomes equal to or more than a given distance. The distance between the optical paths in the area for which position detection is performed will be a certain distance or shorter, which causes the resolution for position detection to be a certain level or higher.

According to a further aspect of the invention, the optical touch panel apparatus displays an image including a partial image occupying the peripheral area on the display unit having the flat panel as a display surface. The partial image occupying the peripheral area notifies that the peripheral area cannot be utilized for position detection.

According to the present invention, position detection is not performed in an area where the resolution for position detection is deteriorated and where unsatisfactory light blocking occurs. In the area for which position detection is performed, the resolution for position detection will not extremely deteriorated and unsatisfactory light blocking is not prone to occur. The present invention, therefore, has a beneficial effect of, for example, enabling stable position detection.

The above and further objects and features of the invention will more fully be apparent from the following detailed description with accompanying drawings.

DETAILED DESCRIPTION

The present invention will specifically be described below with reference to the drawings illustrating embodiments thereof.

Figure 1:
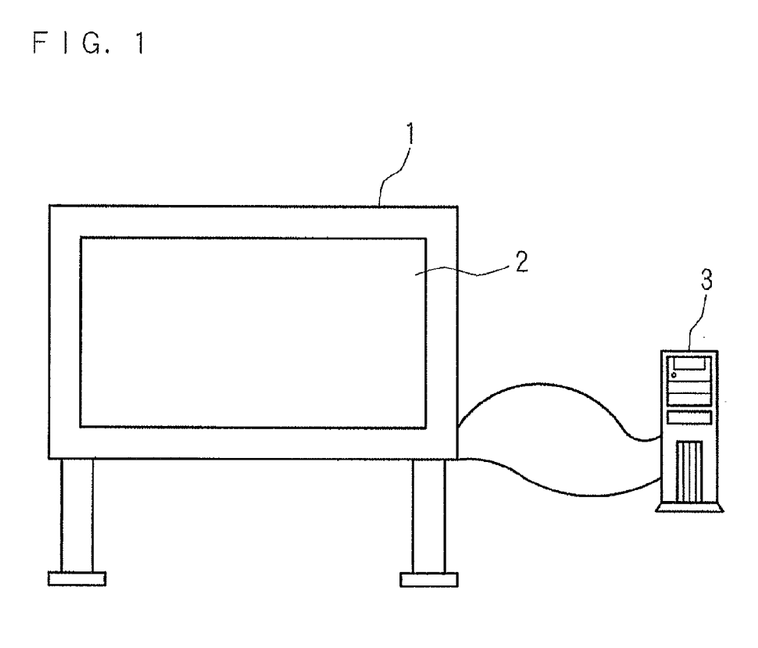
FIG. 1 is a schematic view illustrating an appearance of an optical touch panel apparatus of the present invention.

FIG. 1 is a schematic view illustrating an appearance of an optical touch panel (screen) apparatus of the present invention. The optical touch panel apparatus includes an optical touch panel unit 1 and a processing unit 3 for performing processing using the optical touch panel unit 1. The optical touch panel unit 1 and the processing unit 3 are connected through a communication line. The optical touch panel unit 1 includes a rectangular flat panel 2. The user places a light blocking object such as his/her finger or a pen at any position on the flat, panel 2, and the optical touch panel apparatus performs processing of detecting the position of the light blocking object on the flat panel 2. The processing unit 3 is a computer such as a PC (Personal Computer).

Figure 2:
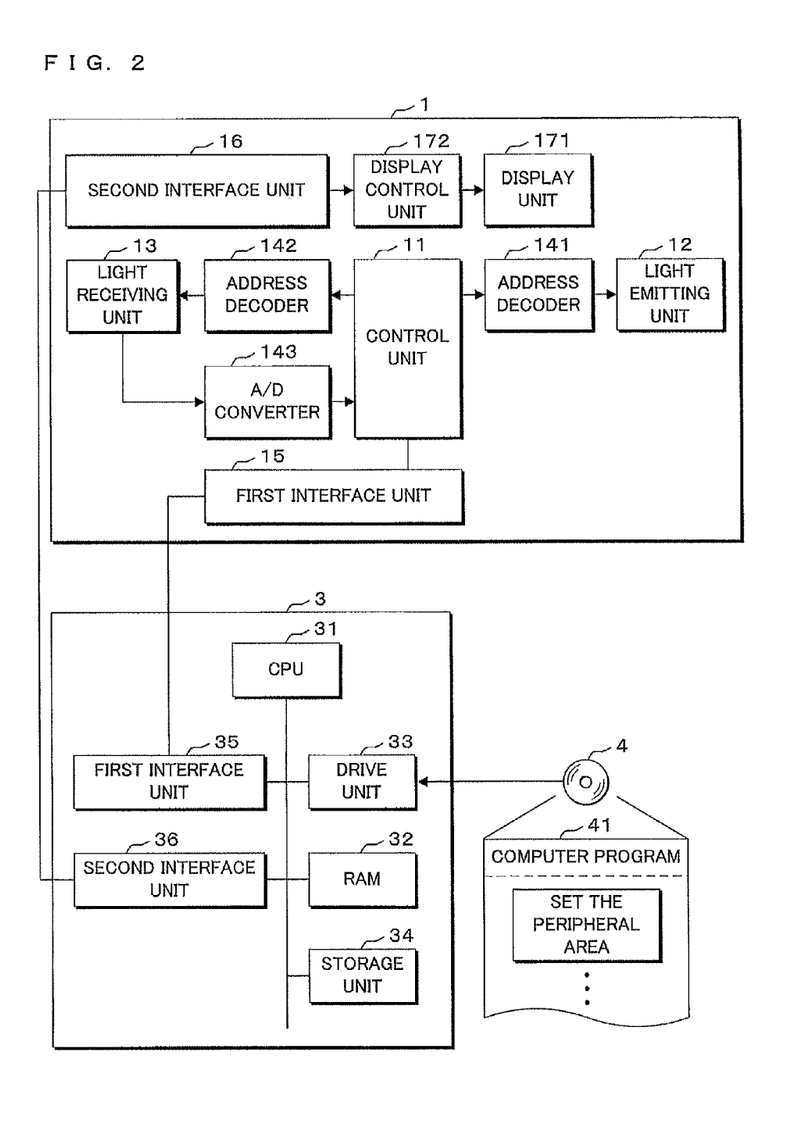
FIG. 2 is a block diagram illustrating internal structures of an optical touch panel unit and a processing unit.

FIG. 2 is a block diagram illustrating internal structures of the optical touch panel unit 1 and the processing unit 3. The optical touch panel unit 1 includes a control unit 11. The control unit 11 is configured with, for example, an arithmetic operation unit for performing arithmetic operation, a memory for storing a control program required for operation of the optical touch panel unit 1, and a memory for storing temporary data associated with arithmetic operation. Moreover, the optical touch panel unit 1 is provided with a light emitting unit 12 including a plurality of light emitting elements and a light receiving unit 13 including a plurality of light receiving elements. The light emitting unit 12 and the light receiving unit 13 correspond to an optical path generation unit in the present invention. The light emitting unit 12 is connected to an address decoder 141, which is further connected to the control unit 11. Furthermore, the light receiving unit 13 is connected to an address decoder 142, which is further connected to the control unit 11. In addition, the light receiving unit 13 is connected to an A/D converter 143, which is further connected to the control unit 11. Moreover, the control unit 11 is connected to the first interface unit 15. The control unit 11 inputs/outputs data to/from the processing unit, 3 through the first interface unit 15. The first interface unit 15 is, for example, an interface unit 15 using USB (Universal Serial Bus).

Furthermore, the optical touch panel 1 includes a display unit 171 configured with an image display panel such as a liquid-crystal panel or an EL (Electroluminescence) panel, and a display control unit 172 performing control so as to cause the display unit 171 to display an image. The display unit 171 is connected to the display control unit 172, which is further connected to the second interface unit 16. The second interface unit 16 is, for example, an interface unit using HDMI (High-Definition Multimedia Interface). The flat panel 2 is a display surface of the display unit 171. The image displayed on the display unit 171 is shown on the flat panel 2, so that the user can see and recognize the image shown on the flat panel 2.

The processing unit 3 includes a CPU (Central Processing Unit) 31 for performing arithmetic operation, a RAM (Random Access Memory) 32 for storing temporary information generated along with the arithmetic operation, a drive unit 33 such as a CD-ROM drive for reading information from a recording medium 4 of the present invention such as an optical disk, and a storage unit 34 such as a hard disk. The CPU 31 causes the drive unit 33 to read a computer program 41 from the recording medium 4 and causes the storage unit 34 to store the read computer program 41 therein. The computer program 41 is loaded from the storage unit 34 to the RAM 32 as required, and the CPU 31 executes processing necessary for the optical touch panel apparatus based on the loaded computer program 41. The storage unit 34 stores data necessary for the processing to be executed by the CPU 31.

The processing unit 3 is further provided with the first interface unit 35 and the second interface unit 36. The first interface unit 35 is connected to the first interface unit 15 of the optical touch panel unit 1 with a communication line, while the second interface unit 36 is connected to the second interface unit 16 of the optical touch panel unit 1 with a communication line. The control unit 11 transmits data necessary for detecting the position of a light blocking object on the flat panel 2 from the first interface unit 15 to the processing unit 3, and the processing unit 3 receives the data at the first interface unit 35. Furthermore, the CPU 31 generates image data representing an image to be displayed on the display unit 171 and transmits it from the second interface unit 36 to the optical touch panel unit 1. The optical touch panel unit 1 receives the image data at the second interface unit 16. The display control unit 172 causes the display unit 171 to display an image based on the received image data.

Figure 3:
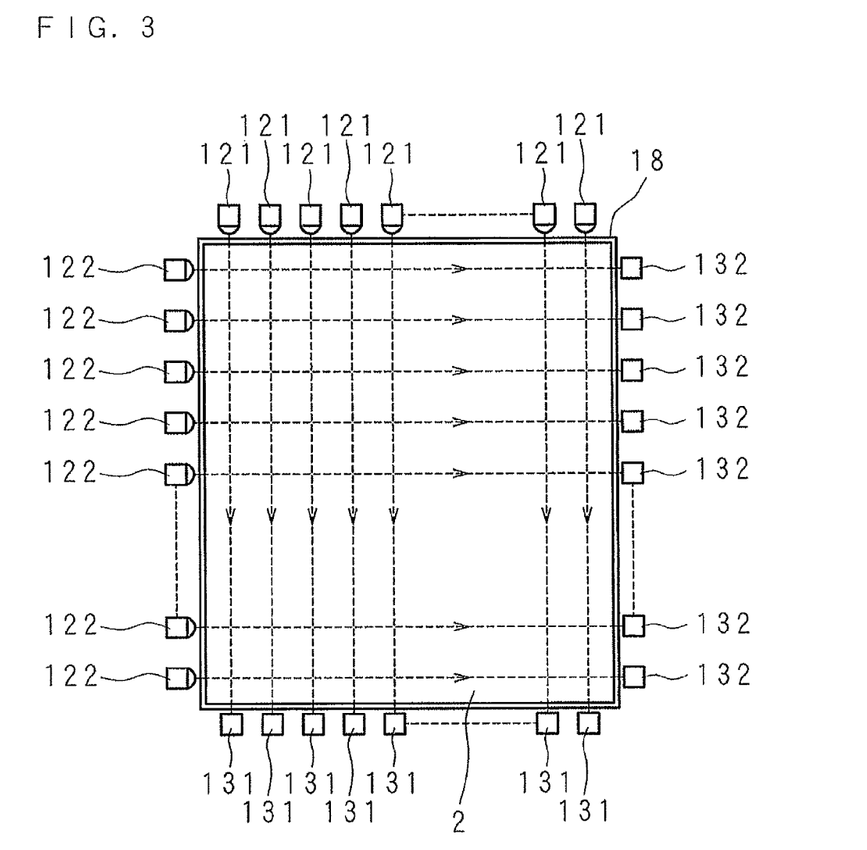
FIG. 3 is a schematic view illustrating structures of a light emitting unit and a light receiving unit.

FIG. 3 is a schematic view illustrating structures of the light emitting unit 12 and the light receiving unit 13. A plurality of light emitting elements 121, 121, . . . are aligned along a side of the rectangular flat panel 2. Each light emitting element 121 is a light emitting diode (LED) which emits infrared light. The direction in which the plurality of light emitting elements 121, 121, . . . are aligned is assumed as the x-axis direction of the display surface 171. Moreover, a plurality of light emitting elements 122, 122, . . . formed of LEDs producing infrared light are aligned along a side adjacent to the above-described side. The direction in which the plurality of light emitting elements 122, 122, . . . are aligned is assumed as the y-axis direction of the display surface 171. The light emitting unit 12 is configured to include the light emitting elements 121, 121, . . . and light emitting elements 122, 122, . . . . The light emitting unit 12 includes a multiplexer (not shown), which is connected to each of the light emitting elements 121, 121, . . . and light emitting elements 122, 122, . . . .

A plurality of light receiving (photo detecting) elements 131, 131, . . . are aligned along a side opposed to a side of the flat panel 2 along which the light emitting elements 121, 121, . . . are arranged. In other words, the light receiving elements 131, 131, . . . are aligned in the x-axis direction. Each of the light emitting elements 121, 121, . . . is opposed to any one of the light receiving elements 131, 131, . . . in one-to-one correspondence. Furthermore, a plurality of light receiving elements 132, 132, . . . are aligned along a side opposed to the side of the flat panel 2 along which the light emitting elements 122, 122, . . . are arranged. In other words, the light receiving elements 132, 132, . . . are aligned in the y-axis direction. Each of the light emitting elements 122, 122, . . . is opposed to any one of the light receiving elements 132, 132, . . . in one-to-one correspondence. Each of the light receiving elements 131 and 132 is a photodiode which receives infrared light. The light receiving unit 13 is configured to include the light receiving elements 131, 131, . . . and light receiving elements 132, 132, . . . . The light receiving unit 13 includes a multiplexer (not shown), which is connected to each of the light receiving elements 131, 131, . . . and light receiving elements 132, 132, . . . .

In FIG. 3, an optical path generated when each light emitting element emits infrared light and a corresponding light receiving element receives the infrared light is shown by a broken line. The light emitting elements 121, 121, . . . and light receiving elements 131, 131, . . . are so arranged that optical paths generated when the light emitting elements 121 and light receiving elements 131 respectively emit and receive light in one-to-one correspondence are in parallel with one another at even intervals along the flat panel 2. Likewise, the light emitting elements 122, 122, . . . and light receiving elements 132, 132, . . . are so arranged that optical paths generated when they respectively emit and receive light in one-to-one correspondence are in parallel with one another at even intervals along the flat panel 2.

Furthermore, a cover 18 made by using a filter through which infrared light penetrates is provided on the front surface of each of the light emitting elements 121, 121, . . . , light emitting elements 122, 122, . . . , light receiving elements 131, 131, . . . and light receiving elements 132, 132, . . . . The infrared light emitted from each light emitting element penetrates through the cover 18 and is received by each light receiving element. The provision of the cover 18 prevents circuit boards in the optical touch panel unit 1 from being exposed. Moreover, the outside light mainly composed of visible light is substantially blocked by the cover 18 and is not received by light receiving elements, thereby eliminating the effect of the outside light on position detection. The cover 18 also prevents foreign substances such as dust from entering the inside of the optical touch panel unit 1.

Figure 4:
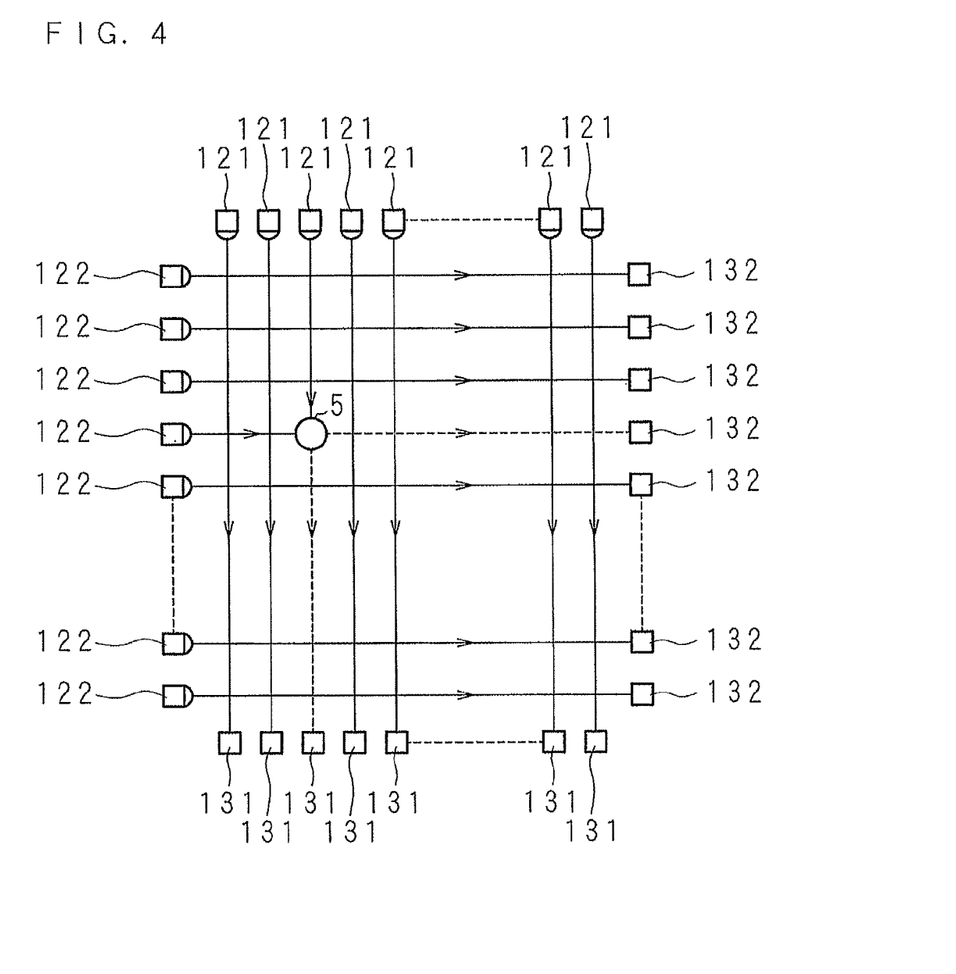
FIG. 4 is an explanatory view illustrating a method of position detection with a whole area scanning method.

FIG. 4 is an explanatory view illustrating a method of position detection with the whole area scanning method. The control unit 11 outputs a signal for sequentially scanning a plurality of light emitting elements to the address decoder 141 and outputs a signal for sequentially scanning a plurality of light receiving elements to the address decoder 142. The address decoder 141 outputs a signal for selecting any one of the light emitting elements 121, 121, . . . and light emitting elements 122, 122, . . . to the light emitting unit 12 in accordance with the signal from the control unit 11. The address decoder 142 outputs a signal for selecting a light receiving element which is opposed to the selected light emitting element in one-to-one correspondence among the light receiving elements 131, 131, . . . and light receiving elements 132, 132, . . . . The selected light emitting element emits infrared light, while the selected light receiving element receives the infrared light and outputs an intensity signal indicating the intensity of the received infrared light by a voltage value to the A/D converter 143. The A/D converter 143 converts the intensity signal from the receiving element into, for example, an 8-bit digital signal, and outputs the converted intensity signal to the control unit 11. The control unit 11 sequentially repeats processing for obtaining an intensity signal from each light receiving element so as to obtain intensity signals from all the light receiving elements. The control unit 11, for example, causes the light emitting elements 121, 121, . . . to sequentially emit light from an end thereof to obtain the intensity signals from the corresponding light receiving elements, and then causes the light emitting elements 122, 122, . . . to sequentially emit light from an end thereof to obtain the intensity signals from the corresponding light receiving elements. In FIG. 4, optical paths are indicated by solid arrows.

The control unit 11 calculates an amount of light received by each light receiving element based on the intensity signal obtained from each light receiving element. If the amount of light received by a light receiving element exceeds a predetermined threshold, the control unit 11 determines that the optical path of infrared light to be received by the light receiving element is not blocked. If the amount of light received by a light receiving element is not more than the predetermined threshold, the control unit 11 determines that the optical path of the infrared light to be received by the light receiving element is blocked. Accordingly, the control unit 11 identifies a light receiving element for which the optical path of infrared light to be received is blocked. If the light blocking object 5 such as the user's finger or a pen is present at any position on the flat panel 2, the optical path passing the position of the light blocking object 5 is blocked. In FIG. 4, optical paths are indicated by solid arrows, while an optical path blocked by the light blocking object 5 is indicated by a broken arrow. The optical touch panel apparatus finds the position of the light blocking object 5 corresponding to the identified light receiving element. For example, if the amount of light received by the light receiving element 131 located at the coordinates (xi, 0) and by the light receiving element 132 located at the coordinates (0, yi) is not more than the threshold while the amount of light received by the other light receiving elements exceeds the threshold, the control unit 11 decides the coordinates for the position of the light blocking object 5 as (xi, yi).

Figure 5:
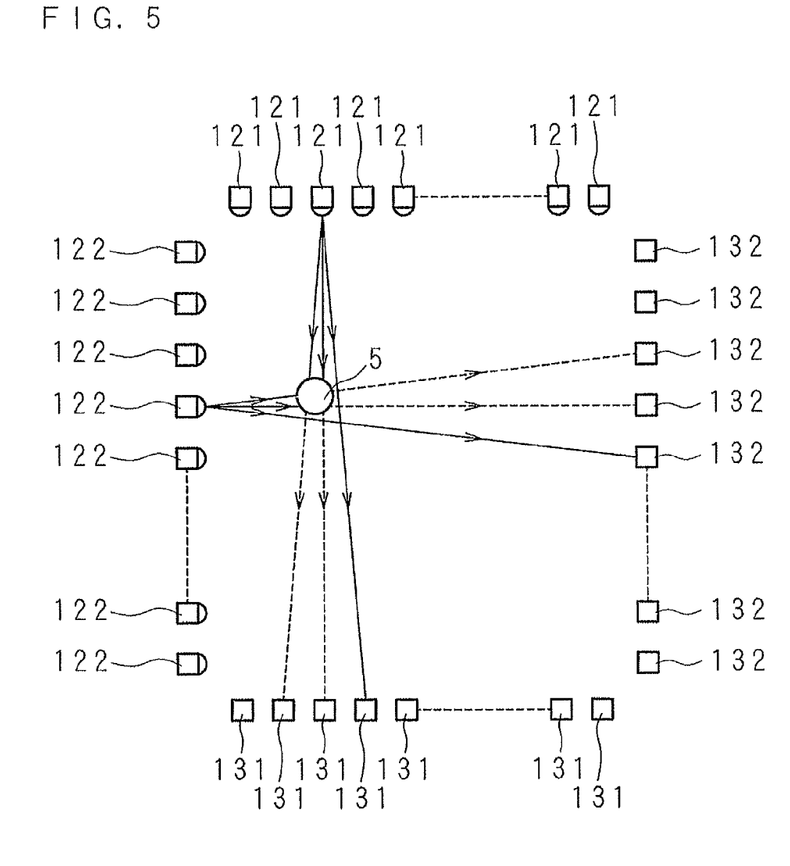
FIG. 5 is an explanatory view illustrating a method of position detection with a specific area scanning method.

FIG. 5 is an explanatory view illustrating a method of position detection with the specific area scanning method. The optical touch panel apparatus detects the position of the light blocking object 5 with the whole area scanning method and thereafter detects the position of the light blocking object 5 with the specific area scanning method in order to detect the position of the light blocking object 5 with higher resolution. The control unit 11 outputs a signal for designating a light emitting element proximal to the light blocking object 5 to the address decoder 141, and outputs a signal for designating a plurality of light receiving elements proximal to the light blocking object 5 to the address decoder 142. The address decoder 141 outputs a signal for selecting any one of the light emitting elements 121, 121, . . . and light emitting elements 122, 122, . . . to the light emitting unit 12 in accordance with the signal from the control unit 11. The address decoder 142 outputs a signal for selecting a plurality of light receiving elements from the light receiving elements 131, 131, . . . and light receiving elements 132, 132, . . . to the light receiving unit 13 in accordance with the signal from the control unit 11. If, for example, the coordinates for the position of the light blocking object 5 is decided as (xi, yi) by the whole area scanning method, the light emitting element 121 located at the coordinates (xi, 0) and the light emitting element 122 located at the coordinates (0, yi) are selected. Also selected are: three light receiving elements 131 including the light receiving element 131 located at the coordinates (xi, 0) and the light receiving elements 131 located adjacent thereto; and three light receiving elements 132 including the light receiving element 132 located at the coordinates (0, yi) and the light receiving elements 132 located adjacent thereto.

The selected light emitting element emits infrared light, while the selected light receiving elements receives infrared light. Here, the infrared light from the selected one light emitting element is received by a plurality of light receiving elements opposed to the light emitting element. Each of the light receiving elements outputs an intensity signal indicating the intensity of the received infrared light by a voltage value to the A/D converter 143, which outputs the intensity signal to the control unit 11. In FIG. 5, the optical paths are indicated by solid arrows while the optical paths blocked by the light blocking object 5 are indicated by broken arrows. As shown in FIG. 5, in the specific area scanning method, a plurality of optical paths are not formed in parallel with one another but formed in a radial pattern.

The optical touch panel apparatus calculates the amount of light received by each light receiving element based on the intensity signal obtained from each light receiving element, determines whether or not each of a plurality of optical paths is blocked, and identifies a light receiving element for which the optical path of infrared light to be received is blocked among the selected light receiving elements. The optical touch panel apparatus finds the position of the light blocking object 5 corresponding to the identified light receiving element. As shown in FIG. 5, since the distance between optical paths is shorter compared to a case with the whole area scanning method, the optical touch panel apparatus can detect the position of the light blocking object 5 with higher resolution. Because the time required for scanning is increased when the entire flat panel 2 is scanned with the specific area scanning method, the optical touch panel apparatus roughly detects the position of the light blocking object 5 with the whole area scanning method and then limit the scanning to the position of the light blocking object 5 for the specific area scanning method. Though FIG. 5 illustrates an example where the light from one light emitting element is received by three light receiving elements, it is also possible that the light from one light emitting element may be received by, for example, five light receiving elements as the number of light receiving elements receiving light from one light emitting element may also be a number other than three.

Figure 6:
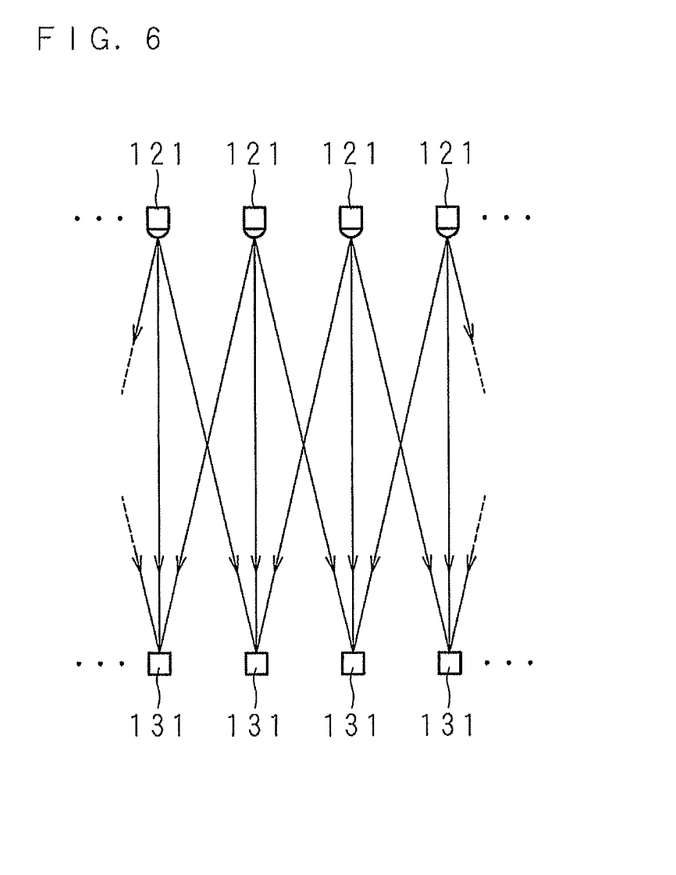
FIG. 6 is an explanatory view illustrating resolution for position detection with the specific area scanning method.

FIG. 6 is an explanatory view illustrating resolution for position detection in the specific area scanning method. FIG. 6 illustrates a part of the light emitting elements 121, 121, . . . and light receiving elements 131, 131, . . . , and shows optical paths used in the specific area scanning method by solid arrows. The resolution for detecting the position of the light blocking object 5 depends on the distance between optical paths. Since the plurality of paths used in the specific area scanning method are not in parallel with each other, the distances between the paths are different depending on a position on the flat panel 2. There is a portion where the paths are close to each other and a portion where the paths are more spaced apart. As the position becomes closer to the light emitting element 121 or the light receiving element 131, the proportion of the portion where the paths are more spaced apart is increased. In particular, at a position proximal to the light emitting element 121 or the light receiving element 131, the distance between optical paths is approximately equal to the distance between the light emitting elements 121 or between the light receiving elements 131 in most portions. Hence, the resolution for position detection becomes more deteriorated as the position approaches closer to the light emitting element 121 or light receiving element 131. Likewise, the resolution for position detection becomes more deteriorated as the position approaches closer to the light emitting element 122 or light receiving element 132.

Figure 7:
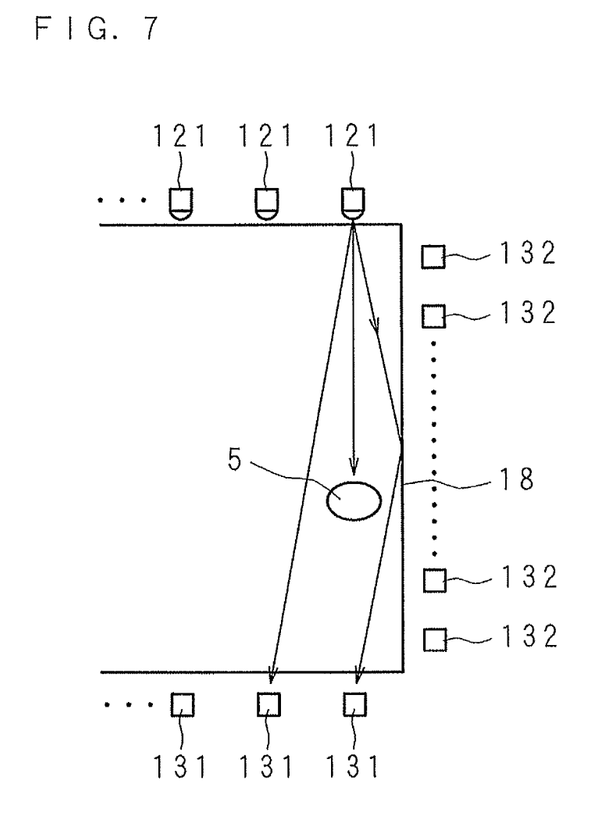
FIG. 7 is an explanatory view illustrating unsatisfactory light blocking.

FIG. 7 is an explanatory view illustrating unsatisfactory light blocking. When the light blocking object 5 is present, the infrared light emitted from the light emitting element 121 is blocked by the light blocking object 5 and is not received by the light receiving element 131. However, a part of the infrared light emitted from the light emitting element 121 may enter the cover 18 provided at the front surface of each light receiving elements 132, 132, . . . , and may reflect on the cover 18 without penetrating therethrough. And then, the part of the infrared light may enter the light receiving element 131 which is not supposed to receive infrared light. If such unsatisfactory light blocking occurs, the position of the light blocking object 5 is not accurately detected. Reflection occurs depending on the incidence angle of infrared light entering the cover 18 and the distance from the light emitting element 121. Thus, unsatisfactory light blocking more frequently occurs as the light emitting element 121 is closer to an end of a side of the flat panel 2. Also at the opposite end in the x-axis direction and at both ends in the y-axis direction, similarly, unsatisfactory light blocking more frequently occurs at a position closer to an end. As described above, it is difficult to stably detect a position for an area closer to light emitting elements or light receiving elements among areas on the flat panel 2 due to deterioration in resolution for position detection and occurrence of unsatisfactory light blocking.

According to the present invention, the optical touch panel apparatus sets a band-like peripheral area on the flat panel 2 and does not perform position detection for such a peripheral area. The peripheral area is an area proximal to light emitting elements or light receiving elements among areas in the flat panel 2, where it is difficult to perform stable position detection, as described earlier. On the contrary, the resolution for position detection is maintained at a certain level in an area other than the peripheral area, and thus unsatisfactory light blocking is unlikely to occur, making it possible to stably perform position detection.

Figure 8:
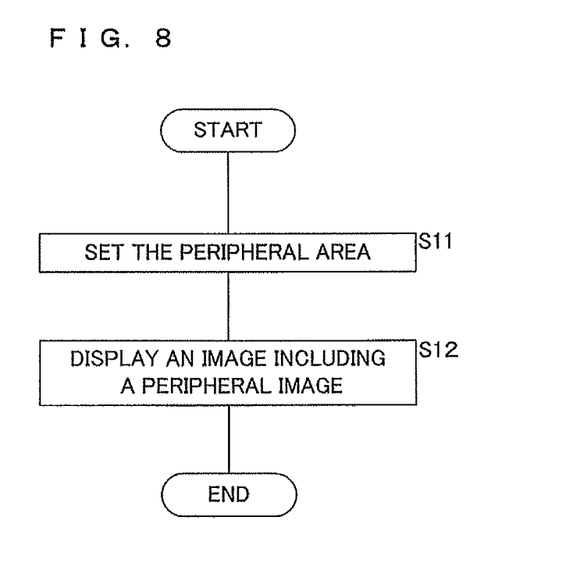
FIG. 8 is a flowchart illustrating a procedure of processing executed by the optical touch panel apparatus at the time of starting operation.

FIG. 8 is a flowchart illustrating a procedure of processing executed by the optical touch panel apparatus at the time of starting operation. The CPU 31 executes the processing below in accordance with the computer program 41. When the optical touch panel apparatus starts operating in response to, for example, the user pressing down an activation switch (not shown), the CPU 31 sets the peripheral area on the flat panel 2, for which position detection is to be prohibited (S11). At step S11, the CPU 31 causes the RAM 32 to store the range of coordinates included in the peripheral area among the coordinates on the flat panel 2. The data indicating the range of coordinates to be included in the peripheral area is either pre-stored in the storage unit 34 or included in the computer program 41. The CPU 31 then performs processing of causing the display unit 171 to display an image including a specific peripheral image occupying the peripheral area in the flat panel 2 (S12). The peripheral image is a partial image occupying a part of an image to be displayed on the display unit 171, as well as an image for visually notifying that the peripheral area cannot be used for position detection. Image data necessary for displaying the peripheral image on the display unit 171 is either pre-stored in the storage unit 34 or included in the computer program 41. At step S12, the CPU 31 generates image data representing an image including the peripheral image using the image data for a peripheral image, and transmits the generated image data from the second interface unit 36 to the optical touch panel unit 1. The optical touch panel unit 1 receives the image data at the second interface unit 16, and the display control unit 172 causes the display unit 171 to display the image including the peripheral image based on the received image data. Since the flat panel 2 is a display surface of the display unit 171, the image is displayed in the flat panel 2.

Figure 9:
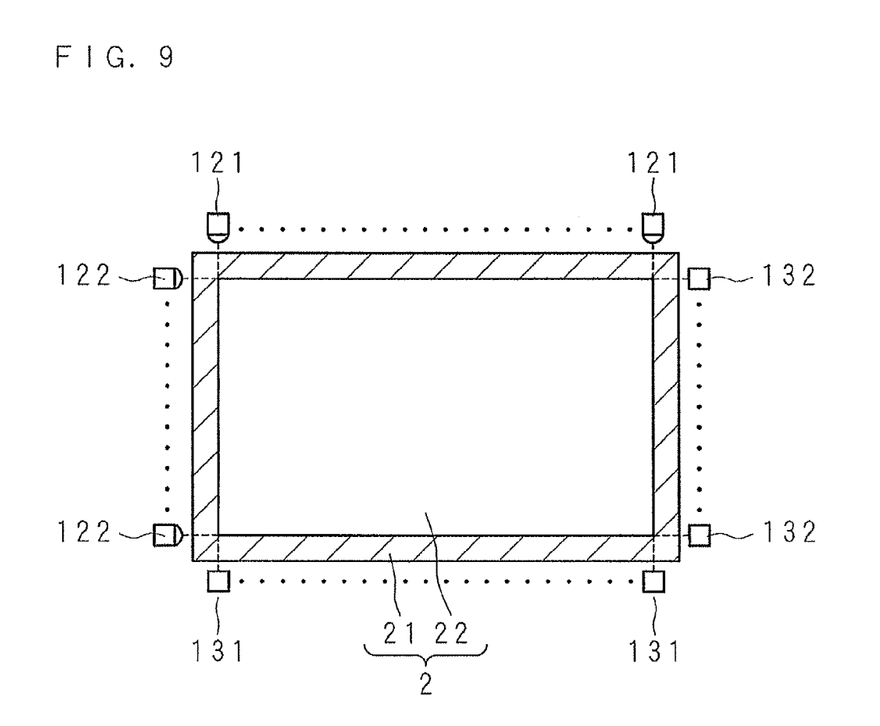
FIG. 9 is a schematic view illustrating an example of a flat panel in which an image including a peripheral image is displayed.

FIG. 9 is a schematic view illustrating an example of the flat panel 2 in which an image including a peripheral image is displayed. Among areas on the flat panel 2, the hatched area in FIG. 9 is a peripheral area 21 while the other area is a detection area 22 for which position detection is possible. The peripheral area 21 is a band-like area on the flat panel 2 and occupying both ends in the x-axis direction and y-axis direction. Moreover, in the example shown in FIG. 9, a line connecting the light emitting elements 121, 121 at both ends of the light emitting elements 121, 121, . . . aligned in the x-axis direction and the light receiving elements 131, 131 at both ends of the light receiving elements 131, 131, . . . are set as a boundary between the peripheral area 21 and the detection area 22. Likewise, a line connecting the light emitting elements 122, 122 at both ends of the light emitting elements 122, 122, . . . aligned in the y-axis direction and the light receiving elements 132, 132 at both ends of the light receiving elements 132, 132, . . . are set as a boundary between the peripheral area 21 and the detection area 22. The peripheral image displayed in the peripheral area 21 is an image for visually clarifying that the peripheral area 21 cannot be used for position detection. For example, the peripheral image is an image with the band-like peripheral area 21 marked out by one color such as black. In another example, the peripheral image is an image including a message indicating by characters that the area cannot be used for position detection. The peripheral area may also be another image such as an image showing various types of information such as current time, or an image indicating a boundary line at the boundary between the peripheral area 21 and the detection area 22.

After step S12 is finished, the optical touch panel apparatus terminates the processing performed at the time of starting operation in a state where the image including the peripheral image is displayed on the display unit 171. The optical touch panel apparatus subsequently executes processing of detecting the position of the light blocking object 5 on the flat panel 2.

It is noted that the peripheral area 21 may be wider than the area illustrated in FIG. 9. The optical touch panel apparatus may also set, as the peripheral area 21, an area where the maximal distance between adjacent optical paths in the x-axis direction or the y-axis direction among a plurality of optical paths used in the specific area scanning method is a given distance or longer. For example, the area in which the maximal distance between optical paths that are adjacent to each other in the x-axis direction or the y-axis direction is more than a half the distance between the light emitting elements or the light receiving elements may be set as the peripheral area 21. Moreover, the optical touch panel apparatus may be a form that can change the peripheral area 21. For example, the processing unit 3 may perform processing of accepting an instruction from the user for changing the peripheral area 21 at an acceptance unit (not shown), and changing the size of the peripheral area 21 in accordance with the accepted instruction.

Furthermore, the optical touch panel apparatus may also have such a form that no image is displayed at the peripheral area 21 instead of displaying a peripheral image at the peripheral area 21. In this example, instead of step S12, the CPU 31 generates image data representing an image with a reduced size obtained by removing a partial image displayed at the peripheral area 21 from the image to be displayed on the entire flat panel 2. The image data is transmitted from the second interface unit 36 and received at the second interface unit 16. The display control unit 172 causes the display unit 171 display the image from which the peripheral area 21 portion is removed based on the received image data.

Figure 10:
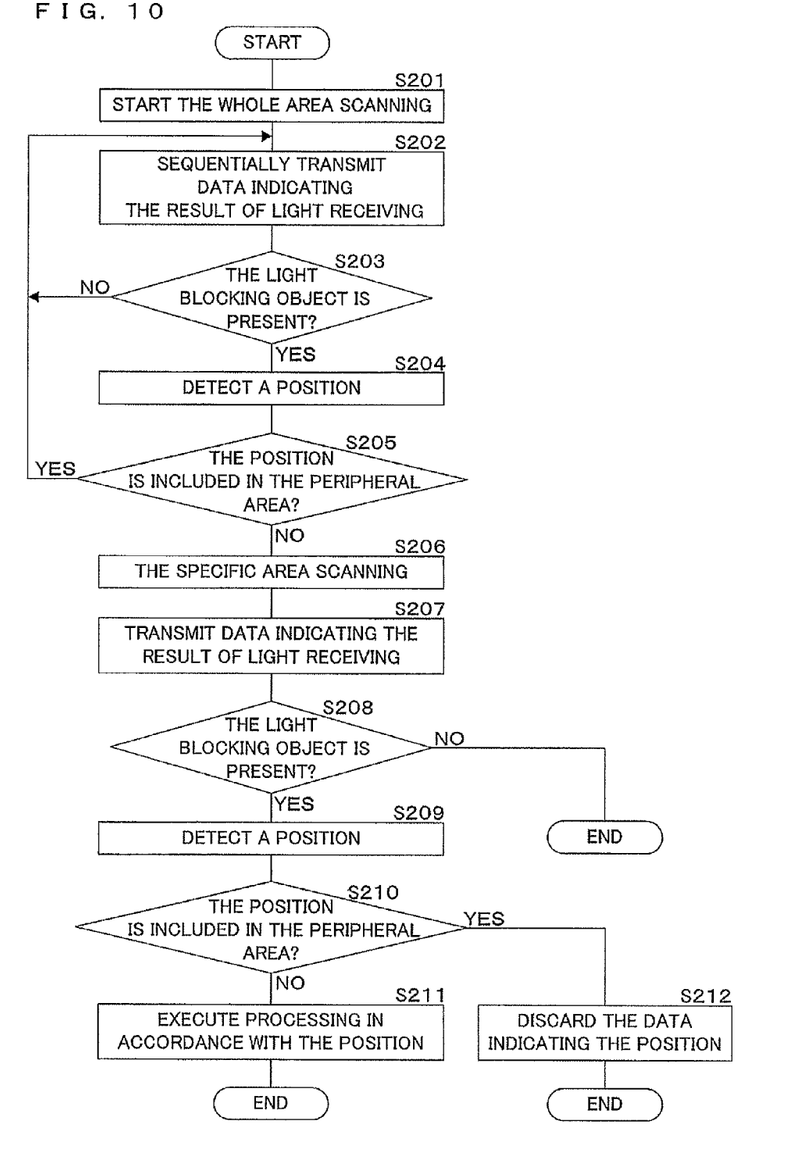
FIG. 10 is a flowchart illustrating a procedure of processing for the optical touch panel apparatus detecting a position of a light blocking object.

FIG. 10 is a flowchart illustrating a procedure of processing for the optical touch panel apparatus detecting a position of the light blocking object 5. The CPU 31 executes the processing below in accordance with the computer program 41. The CPU 31 transmits an instruction to start scanning the entire area for detecting the position of the light blocking object 5 with the whole area scanning method to the optical touch panel unit 1. The optical touch panel unit 1 receives an instruction from the processing unit 3 at the first interface unit 15. The control unit 11 outputs necessary signals to the address decoder 141 and address decoder 142, to start the whole area scanning (S201). The light emitting elements 121, 121, . . . and light emitting elements 122, 122, . . . sequentially emit light, while each of the corresponding receiving elements opposed to the light emitting elements that emitted light in one-to-one correspondence among the light receiving elements 131, 131, . . . and light receiving elements 132, 132, . . . outputs an intensity signal to the A/D converter 143. The A/D converter 143 converts the intensity signal from the light receiving element into a digital signal and outputs it to the control unit 11. The control unit 11 sequentially transmits data indicating the result of light receiving at each light receiving element according to the intensity signal from each light receiving element, from the first interface unit 15 to the processing unit 3 (S202). Here, data indicating coordinates for each light receiving element is also transmitted together with the result of light receiving at each light receiving element. Note that the processing unit 3 may store the data indicating the coordinates for each light receiving element in the storage unit 34, and the control unit 11 may transmit data for identifying each light receiving element at step S202.

The processing unit 3 receives data from the optical touch panel unit 1 at the first interface unit 35. The CPU 31 determines whether or not the light blocking object 5 is present on the flat panel 2 based on the received data (S203). At step S203, the CPU 31 determines that the light blocking object 5 which blocks the optical path of infrared light to be received by a light receiving element is present if there is a light receiving element with the amount of received light indicated by the received data equal to or lower than a threshold. The CPU 31 further determines that the light blocking object 5 is not present if there is no light receiving element with the amount of received light equal to or lower than the threshold. If the light blocking object 5 is not present (S203: NO), the CPU 31 transmits a control signal for continuing the whole area scanning from the first interface unit 35, to return the processing to step S202.

If the light blocking object 5 is present at step S203 (S203: YES), the CPU 31 performs processing for detecting a position of the light blocking object 5 on the flat panel 2 (S204). At step S204, the CPU 31 finds coordinates for the light blocking object 5 on the flat panel 2 based on the coordinates for the light receiving element which has an amount of received light equal to or lower than the threshold. The CPU 31 subsequently determines whether or not the position of the detected light blocking object 5 on the flat panel 2 is included in the peripheral area 21 (S205). At step S205, the CPU 31 determines that the position of the light blocking object 5 is included in the peripheral area 21 when the coordinates for the light blocking object 5 is included in the range of the coordinates for the peripheral area 21 stored in RAM 32. The CPU 31 further determines that the position of the light blocking object 5 is included in the detection area 22 when the coordinates for the light blocking object 5 is not included in the range of the coordinates for the peripheral area 21. If the position of the light blocking object 5 on the flat panel 2 is included in the peripheral area 21 (S205: YES), the CPU 31 returns the processing to step S202.

If the position of the light blocking object 5 is included in the detection area 22 at step S205 (S205: NO), the optical touch panel apparatus performs the specific area scanning for detecting the position of the light blocking object 5 (S206). At step S206, the CPU 31 transmits data indicating the position of the light blocking object 5 detected at step S204 as well as an instruction to start the specific area scanning, from the first interface unit 35 to the optical touch panel unit 1. The optical touch panel unit 1 receives the data indicating the position of the light blocking object 5 and the instruction to start the specific area scanning at the first interface unit 15. The control unit 11 identifies a light emitting element and a plurality of light receiving elements that are proximal to the light blocking object 5 based on the data indicating the position of the light blocking object 5, outputs a signal for designating the identified light emitting element to the address decoder 141, and outputs a signal for designating the identified light receiving elements to the address decoder 142. In accordance with the signals from the control unit 11, the address decoder 141 outputs a signal for selecting the designated light emitting element to the light emitting unit 12 and outputs a signal for selecting the designated light receiving elements to the light receiving unit 13. The light emitting element 121 and light emitting element 122 that are proximal to the light blocking object 5, and the selected light receiving elements 131, 131, . . . and light receiving elements 132, 132, . . . output an intensity signal to the A/D converter 143. The A/D converter 143 converts the intensity signal from each light receiving element into a digital signal and outputs it to the control unit 11. The control unit 11 transmits the data indicating a result of light receiving at each light receiving element in accordance with the intensity signal from the first interface unit 15 to the processing unit 3 (S207).

The processing unit 3 receives the data from the optical touch panel unit 1 at the first interface unit 35. The CPU 31 determines whether or not the light blocking object 5 is present on the flat panel 2 based on the received data (S208). If the light blocking object 5 is not present (S208: NO), the CPU 31 terminates the processing of detecting the position of the light blocking object 5. If the light blocking object 5 is present (S208: YES), the CPU 31 performs processing of detecting the position of the light blocking object 5 on the flat panel 2 (S209). At step S209, the CPU 31 calculates coordinates for the light blocking object 5 on the flat panel 2 based on the positional relationship between a light emitting element that emitted light and a light receiving element having an amount of received light higher than the threshold, and between the light emitting element and a light receiving element having an amount of received light not higher than the threshold. The obtained coordinates are more accurate than the coordinates obtained at step S204. Note that the CPU 31 may perform processing of finding a range of coordinates for the light blocking object 5 occupying the flat panel 2, instead of finding coordinates for the light blocking object 5 at one point.

The CPU 31 subsequently determines whether or not the position of the detected light blocking object 5 on the flat panel 2 is included in the peripheral area 21 (S210). If the position of the light blocking object 5 on the flat panel 2 is included in the peripheral area 21 (S210: YES), the CPU 31 discards the data indicating the position of the light blocking object 5 (S212). The discard of the data indicating the position will invalidate the result of position detection performed at step S209. After step S212 is completed, the CPU 31 terminates the processing of detecting the position of the light blocking object 5.

If the position of the light blocking object 5 is included in the detection area 22 at step S210 (S210: NO), the CPU 31 executes processing in accordance with the position of the light blocking object 5 (S211). For example, the CPU 31 performs processing of causing the display unit 171 to display an image showing a track of the light blocking object 5 on the flat panel 2 at step S211. In another example, the CPU 31 performs processing of executing a predetermined application in accordance with the position of the light blocking object 5. After step S211 is completed, the CPU 31 terminates the processing of detecting the position of the light blocking object 5. The optical touch panel apparatus repeatedly executes the processing from step S201 to step S212 as needed.

As has been described in detail, the optical touch panel apparatus sets the peripheral area 21 on the flat panel 2, and detects the position of the light blocking object 5 in the detection area 22 which is other than the peripheral area 21, while not detecting the position of the light blocking object 5 in the peripheral area 21. Since resolution for position detection is deteriorated and unsatisfactory light blocking occurs in the peripheral area 21, no position detection is performed in the peripheral area 21 so as to prevent deterioration in resolution for position detection and occurrence of unsatisfactory light blocking. Moreover, resolution for position detection is not extremely deteriorated in the detection area 22 and unsatisfactory light blocking is not prone to occur. By limiting the area for which position detection is performed to the detection area 22, the position of the light blocking object 5 can stably be detected.

Furthermore, the optical touch panel apparatus makes the peripheral area 21 include an area outside the line connecting the light emitting elements on both ends and the light receiving elements on both ends in the x-axis direction and the y-axis direction. This area is the closest to any one of the light emitting elements or light receiving elements, and thus the resolution for position detection becomes the lowest in this area. Inclusion of this area in the peripheral area 21 reliably prevents deterioration in resolution for position detection. Furthermore, in a form where an area with the maximal distance between optical paths is equal to or more than a given distance is set as the peripheral area 21, the distance between optical paths in the detection area 22 is not more than a certain distance. The optical touch panel apparatus can, therefore, control the resolution for position detection to be a certain level or higher.

The optical touch panel apparatus causes the display unit 171 to display an image including the peripheral image occupying the peripheral area 21. The peripheral image notifies the user that the peripheral area 21 cannot be used for position detection, so that the user can easily avoid the peripheral area 21 in using the optical touch panel apparatus. This reduces the risk that the user utilizes by mistake the peripheral area 21 which cannot be used for position detection for the light blocking object 5. Furthermore, in a form where no image is displayed in the peripheral area 21, the user can easily avoid the peripheral area 21 in using the optical touch panel apparatus.

Though an example was described where the optical touch panel unit 1 and the processing unit 3 include two types of interface units and are connected with each other by two communication lines, another example may also be possible where the optical touch panel unit 1 and the processing unit 3 include one type of interface unit and are connected by one communication line. Though the present embodiment showed an example where the optical touch panel unit 1 transmits the result of light receiving at a light receiving element to the processing unit 3, the optical touch panel unit 1 performs processing of detecting the position of the light blocking object 5 based on the result of light receiving and transmitting information indicating the detected position to the processing unit 3. Furthermore, the optical touch panel apparatus may have a form of not performing position detection in the peripheral area 21 with a method different from the processing performed at steps S201 to S212, for example, by not generating an optical path passing through the peripheral area 21 or not processing the detection result of an optical path passing through the peripheral area 21.

Moreover, though the present embodiment showed an example where the optical path of infrared light is used as the optical path used for position detection, the optical touch panel apparatus may use an optical path of another wavelength as the optical path used for position detection. Though the present embodiment showed an example where the optical touch panel apparatus includes the optical touch panel unit 1 and the processing unit 3, the optical touch panel apparatus may also take a form where all kinds of processing are executed by the optical touch panel unit 1 without including the processing unit 3. Furthermore, though the flat panel 2 is a rectangular shape in the present embodiment, the optical touch panel apparatus may also take a form of including the flat panel 2 of another shape such as circular. Moreover, the optical touch panel apparatus may have a form of not including the function of displaying an image.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An optical touch panel apparatus, comprising:
   a flat panel which is rectangular in shape;
   an optical path generation unit, which includes a plurality of light emitting elements arranged along each of adjacent two sides of the flat panel and a plurality of light receiving elements arranged along sides respectively opposed to the two sides, for generating a plurality of optical paths on the flat panel by receiving light emitted from one light emitting element of the plurality of light emitting elements at a plurality of light receiving elements opposite to the one light emitting element;
   a detection unit for detecting a position at which any one of the plurality of optical paths is blocked on the flat panel;
   a setting unit for setting a band-like peripheral area on the flat panel as an area where the resolution for detection of the position is lower than a specific resolution for detection of the position in an area excluding the band-like peripheral area; and
   an area limitation unit for limiting an area for which detection of the position is to be performed among areas on the flat panel to the area excluding the band-like peripheral area set by the setting unit for which no detection of the position is to be performed.

2. The optical touch panel apparatus according to claim 1, wherein
   the setting unit sets the band-like peripheral area so as to include an area outside a line connecting light emitting elements arranged on both ends of one side of the two sides and a light receiving elements arranged on both ends of a side opposed to said one side to be in parallel with each other, and outside a line connecting light emitting elements arranged on both ends of the other side of the two sides and light receiving elements arranged on both ends of a side opposed to said other side to be in parallel with each other.

3. The optical touch panel apparatus according to claim 2, wherein
   the setting unit sets the band-like peripheral area so as to include an area, among areas on the flat panel, in which a distance between optical paths so generated by the optical path generation unit that light from one light emitting element is received by a plurality of light receiving elements is equal to or more than a given distance.

4. The optical touch panel apparatus according to claim 1, wherein
   the setting unit sets the band-like peripheral area so as to include an area, among areas on the flat panel, in which a distance between optical paths generated by the optical path generation unit is equal to or more than a given distance.

5. The optical touch panel apparatus according to claim 1, further comprising:
   a display unit for displaying an image on the flat panel used as a display surface; and
   a display control unit for causing the display unit to display an image including a specific partial image occupying the band-like peripheral area in the flat panel.

6. An optical touch panel apparatus, comprising:
   an optical touch panel unit; and
   a processing unit, wherein
   the optical touch panel unit includes:
   a flat panel which is rectangular in shape;
   a plurality of light emitting elements arranged along each of adjacent two sides of the flat panel;
   a plurality of light receiving elements arranged along sides respectively opposed to the two sides of the flat panel;
   an optical path generation unit for generating a plurality of optical paths on the flat panel by receiving light emitted from one light emitting element of the plurality of light emitting elements at a plurality of light receiving elements opposite to the one light emitting element; and
   an input unit for inputting to the processing unit a result of light receiving at the plurality of light receiving elements in a case where any one of the light emitting elements emits light,
   the processing unit includes:
   a setting unit for setting a band-like peripheral area on the flat panel as an area where the resolution for detection of a position at which any one of the plurality of optical paths is blocked is lower than a specific resolution for detection of the position in an area excluding the band-like peripheral area;
   a detection unit for detecting a position at which any one of the plurality of optical paths is blocked on the flat panel based on the result of light receiving input from the optical touch panel unit; and
   an invalidation unit for invalidating all detection results for the position if the position detected by the detection unit is included in the band-like peripheral area.

7. A non-transitory recording medium recording a computer program for causing a computer, to which a result of light receiving at a plurality of light receiving elements in a case where any of a plurality of light emitting elements emits light is input from an optical touch panel unit having a flat panel as well as the plurality of light emitting elements and light receiving elements generating a plurality of optical paths on the flat panel, to execute processing of detecting a position at which any one of the plurality of optical paths is blocked on the flat panel based on which light receiving element is to receive the blocked light, said computer program comprising the steps of:
   causing the computer to set a band-like peripheral area on the flat panel as the area where the resolution for detection of the position is lower than a specific resolution for detection of the position in an area excluding the band-like peripheral area;
   causing the computer to detect the position based on the result of light receiving input from the optical touch panel unit; and
   causing the computer to invalidate all detection results for the position if the detected position is included in the band-like peripheral area.

* * * * *